US012810239B2

(12) United States Patent
Lert, Jr. et al.

(10) Patent No.: US 12,810,239 B2
(45) Date of Patent: Nov. 24, 2026

(54) FULLY AUTOMATED SELF-SERVICE STORE

(71) Applicant: Symbotic LLC, Wilmington, MA (US)

(72) Inventors: John G. Lert, Jr., Wakefield, MA (US); William J. Fosnight, Windham, NH (US); Matthew W. Coady, Hollis, NH (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 18/222,320

(22) Filed: Jul. 14, 2023

(65) Prior Publication Data

US 2024/0013144 A1 Jan. 11, 2024

Related U.S. Application Data

(63) Continuation of application No. 15/987,736, filed on May 23, 2018, now abandoned.

(60) Provisional application No. 62/509,875, filed on May 23, 2017.

(51) Int. Cl.
*G06Q 10/087* (2023.01)
*G06K 7/10* (2006.01)
*G06Q 10/00* (2023.01)

(52) U.S. Cl.
CPC ....... *G06Q 10/087* (2013.01); *G06K 7/10366* (2013.01); *G06Q 10/00* (2013.01)

(58) Field of Classification Search
CPC .................................................. G06Q 10/087
USPC ....................................................... 235/383
See application file for complete search history.

(56) References Cited

U.S. PATENT DOCUMENTS 4,618,031 A * 10/1986 Belloche .................. B65G 1/02 414/281
5,179,329 A 1/1993 Nishikawa
5,472,309 A 12/1995 Bernard, II
5,642,976 A 7/1997 Konstant
6,140,922 A 10/2000 Kakou
6,289,260 B1 9/2001 Bradley
7,591,630 B2 9/2009 Lert, Jr.
7,861,844 B2 1/2011 Hayduchok
7,894,932 B2 2/2011 Mountz
7,894,933 B2 2/2011 Mountz
7,991,505 B2 8/2011 Lert, Jr.
8,104,601 B2 1/2012 Hayduchok
8,162,174 B2 4/2012 Hieb
(Continued)

FOREIGN PATENT DOCUMENTS

CN 104903921 9/2015
EP 2650237 B1 11/2014
(Continued)

OTHER PUBLICATIONS

Communication pursuant to Article 94(3) EPC dated Dec. 10, 2020 in European Patent Application No. 18730616.2.
(Continued)

*Primary Examiner* — Daniel St Cyr
(74) *Attorney, Agent, or Firm* — Perman & Green, LLP

(57) ABSTRACT

An automated self-service store is disclosed including a shopper accessible level having inventory for selection by a shopper, and an item storage and replenishment area for storing inventory. The self-service store further includes mobile robots for replenishing inventory at the shopper accessible level from the item storage and replenishment area.

20 Claims, 18 Drawing Sheets

(56) References Cited

U.S. PATENT DOCUMENTS

| | | | |
|---|---|---|---|
| 8,276,740 B2 | 10/2012 | Hayduchok | |
| 8,289,260 B2 | 10/2012 | Kim | |
| 8,311,902 B2 | 11/2012 | Mountz | |
| 8,425,173 B2 | 4/2013 | Lert | |
| 8,447,665 B1 | 5/2013 | Schoenharl | |
| 8,483,869 B2 | 7/2013 | Wurman | |
| 8,527,325 B1 | 9/2013 | Atreya | |
| 8,594,835 B2 | 11/2013 | Lert | |
| 8,622,194 B2 | 1/2014 | Dewitt | |
| 8,626,335 B2 | 1/2014 | Wurman | |
| 8,694,152 B2 | 4/2014 | Cyrulik | |
| 8,718,814 B1 | 5/2014 | Clark | |
| 8,740,538 B2 | 6/2014 | Lert | |
| 8,831,984 B2 | 9/2014 | Hoffman | |
| 8,892,240 B1 | 11/2014 | Vliet | |
| 8,965,562 B1 | 2/2015 | Wurman | |
| 8,972,045 B1 | 3/2015 | Mountz | |
| 8,983,647 B1 | 3/2015 | Dwarakanath | |
| 9,008,828 B2 | 4/2015 | Worsley | |
| 9,008,829 B2 | 4/2015 | Worsley | |
| 9,008,830 B2 | 4/2015 | Worsley | |
| 9,020,632 B2 | 4/2015 | Naylor | |
| 9,037,286 B2 | 5/2015 | Lert | |
| 9,051,120 B2 | 6/2015 | Lert | |
| 9,096,375 B2 | 8/2015 | Lert | |
| 9,111,251 B1 | 8/2015 | Brazeau | |
| 9,129,250 B1 | 9/2015 | Sestini | |
| 9,139,363 B2 | 9/2015 | Lert | |
| 9,242,798 B2 | 1/2016 | Guan | |
| 9,260,245 B2 | 2/2016 | Este | |
| 9,321,591 B2 | 4/2016 | Lert | |
| 9,330,373 B2 | 5/2016 | Mountz | |
| 9,334,113 B2 | 5/2016 | Naylor | |
| 9,334,116 B2 | 5/2016 | Dewitt | |
| 9,378,482 B1 | 6/2016 | Pikler | |
| 9,423,796 B2 | 8/2016 | Sullivan | |
| 9,428,295 B2 | 8/2016 | Vliet | |
| 9,591,630 B2 | 3/2017 | Kato | |
| 9,598,239 B2 | 3/2017 | Lert, Jr. | |
| 10,919,701 B2 | 2/2021 | Lert, Jr. | |
| 11,315,072 B2 | 4/2022 | Lert, Jr. | |
| 2003/0177069 A1 | 9/2003 | Joseph | |
| 2005/0047895 A1 | 3/2005 | Lert | |
| 2006/0257236 A1 | 11/2006 | Stingel, III | |
| 2007/0125727 A1 | 6/2007 | Winkler | |
| 2007/0127691 A1 | 6/2007 | Lert, Jr. | |
| 2008/0174432 A1 | 7/2008 | Ulrich | |
| 2010/0076591 A1 | 3/2010 | Lert, Jr. | |
| 2010/0316468 A1 | 12/2010 | Lert | |
| 2010/0316469 A1 | 12/2010 | Lert | |
| 2010/0316470 A1 | 12/2010 | Lert | |
| 2010/0322746 A1 | 12/2010 | Lert | |
| 2010/0322747 A1 | 12/2010 | Lert | |
| 2012/0101627 A1 | 4/2012 | Lert | |
| 2012/0186942 A1 | 7/2012 | Toebes | |
| 2012/0195720 A1 | 8/2012 | Sullivan | |
| 2012/0298688 A1* | 11/2012 | Stiernagle | G06Q 20/18 221/155 |
| 2013/0118094 A1* | 5/2013 | Laspia | E04H 1/00 52/79.1 |
| 2013/0246229 A1 | 9/2013 | Mountz | |
| 2014/0088758 A1 | 3/2014 | Lert | |
| 2014/0100769 A1* | 4/2014 | Wurman | B65G 1/10 705/22 |
| 2014/0212249 A1 | 7/2014 | Kawano | |
| 2014/0271063 A1 | 9/2014 | Lert | |
| 2014/0288696 A1 | 9/2014 | Lert | |
| 2014/0308098 A1 | 10/2014 | Lert | |
| 2015/0266672 A1 | 9/2015 | Lert | |
| 2015/0286967 A1 | 10/2015 | Lert | |
| 2015/0310694 A1 | 10/2015 | Will | |
| 2015/0375938 A9 | 12/2015 | Lert | |
| 2016/0016733 A1 | 1/2016 | Lert | |
| 2016/0075512 A1 | 3/2016 | Lert, Jr. | |
| 2016/0355337 A1 | 12/2016 | Lert | |
| 2017/0043953 A1 | 2/2017 | Battles | |
| 2017/0137222 A1 | 5/2017 | Lert, Jr. | |
| 2017/0137223 A1 | 5/2017 | Lert, Jr. | |
| 2017/0158430 A1 | 6/2017 | Raizer | |
| 2017/0267452 A1 | 9/2017 | Goren | |
| 2017/0297820 A1 | 10/2017 | Grinnell | |
| 2017/0313514 A1 | 11/2017 | Lert, Jr. | |
| 2017/0330142 A1 | 11/2017 | Kanellos | |
| 2018/0134492 A1 | 5/2018 | Lert, Jr. | |
| 2018/0150793 A1 | 5/2018 | Lert, Jr. | |
| 2018/0341908 A1 | 11/2018 | Lert, Jr. | |

FOREIGN PATENT DOCUMENTS

| | | |
|---|---|---|
| EP | 2651786 B1 | 5/2016 |
| EP | 2651787 B1 | 5/2016 |
| JP | S60228302 | 11/1985 |
| JP | H0464501 | 2/1992 |
| JP | H4064501 | 2/1992 |
| JP | 1993120521 | 5/1993 |
| JP | H05120521 | 5/1993 |
| JP | 1994223091 | 8/1994 |
| JP | H06223091 | 8/1994 |
| JP | 2000200391 | 7/2000 |
| JP | 2002334229 | 11/2002 |
| JP | 2006240785 | 9/2006 |
| JP | 2007256998 | 10/2007 |
| JP | 4067292 | 3/2008 |
| JP | 4475093 | 6/2010 |
| JP | 5276016 | 8/2013 |
| JP | 2015533749 | 11/2015 |
| JP | 2017071470 | 4/2017 |
| WO | 2005097550 A2 | 10/2005 |
| WO | 2016172793 A1 | 11/2016 |
| WO | 2016199033 A1 | 12/2016 |
| WO | 2017064401 A1 | 4/2017 |

OTHER PUBLICATIONS

English language Abstract for WO2017064401 published Apr. 20, 2017.
English language Patent Abstract for JP1993-120521 published May 18, 1993.
English language Patent Abstract for JP1994-223091 published Aug. 12, 1994.
English language Patent Abstract for JP2000-200391 published Jul. 18, 2000.
English language Patent Abstract for JP2002-334229 published Nov. 22, 2002.
English language Patent Abstract for JP2006-240785 published Sep. 14, 2006.
English language Patent Abstract for JP2007-256998 published Oct. 4, 2007.
English language Patent Abstract for JP2017-071470 published Apr. 13, 2017.
English language Patent Abstract for JP4067292 published Jan. 18, 2008.
English language Patent Abstract for JP4475093 published Mar. 19, 2010.
English language Patent Abstract for JPH4-064501 published Feb. 28, 1992.
Examination Report dated Nov. 12, 2020 in Australian Patent Application No. 2018273896.
Examiner's Report dated Feb. 19, 2021 in Canadian Patent Application No. 3,063,430.
International Search Report and Written Opinion dated Jul. 19, 2018 in International Patent Application No. PCT/US2018/034240.
Office Action dated Feb. 15, 2021 in Japanese Patent Application No. 2019-564955.
Office Action dated Jan. 17, 2022 in Japanese Patent Application No. 2019-564955.
Response to Communication pursuant to Article 94(3) EPC dated Jun. 21, 2021 in European Patent Application No. 18730616.2.
Response to Office Action dated Aug. 13, 2021 in Japanese Patent Application No. 2019-564955.

(56) References Cited

OTHER PUBLICATIONS

Response to Office Action dated Sep. 22, 2021 in Canadian Patent Application No. 3063430.
Response to Office Action filed Jul. 17, 2020 in European Patent Application No. 18730616.2.
U.S. Appl. No. 15/987,736; Notice of Allowance mailed Apr. 14, 2023; (7 pages).
U.S. Appl. No. 15/987,736; Office Action mailed Apr. 23, 2020; (7 pages).
U.S. Appl. No. 15/987,736; Office Action mailed May 10, 2019; (9 pages).
U.S. Appl. No. 15/987,736; Office Action mailed May 25, 2021; (9 pages).
U.S. Appl. No. 15/987,736; Office Action mailed Jul. 19, 2022; (9 pages).
U.S. Appl. No. 15/987,736; Office Action mailed Sep. 24, 2020; (8 pages).
U.S. Appl. No. 15/987,736; Office Action mailed Sep. 25, 2019; (6 pages).
U.S. Appl. No. 15/987,736; Office Action mailed Oct. 4, 2018; (8 pages).
U.S. Appl. No. 15/987,736; Office Action mailed Dec. 9, 2021; (8 pages).

* cited by examiner

FULLY AUTOMATED SELF-SERVICE STORE

PRIORITY CLAIM

This application is a continuation of U.S. application Ser. No. 15/987,736, filed May 23, 2018, entitled "FULLY AUTOMATED SELF-SERVICE STORE" which claims the benefit of U.S. Provisional Application No. 62/509,875, filed May 23, 2017, entitled "FULLY AUTOMATED SELF-SERVICE STORE", both of which are hereby incorporated herein by reference in their entirety for all purposes.

BACKGROUND

An order-fulfillment system for use in supply chains, for example in retail supply chains, may fulfill orders for individual product units, referred to herein as "eaches" (also called "pieces", "articles", "items" or, generally, any articles available for purchase in retail as a purchase unit, etc.), which are typically packaged and shipped by the manufacturer in containers known as "cases". The "each" as used herein for convenience purposes, may be considered the most granular unit of handling in retail supply chains. In conventional retail outlets, consumers pick eaches off of shelves. When an each is out of inventory, there is no ability to restock that article in real time. Additionally, there is no effective system at tracking what eaches a consumer has selected for purchases, other than traditional check out methods where consumers wait in line and each item is then scanned and registered.

DESCRIPTION OF THE DRAWINGS

The following is a brief description of the drawings.

DETAILED DESCRIPTION

Figure 1:
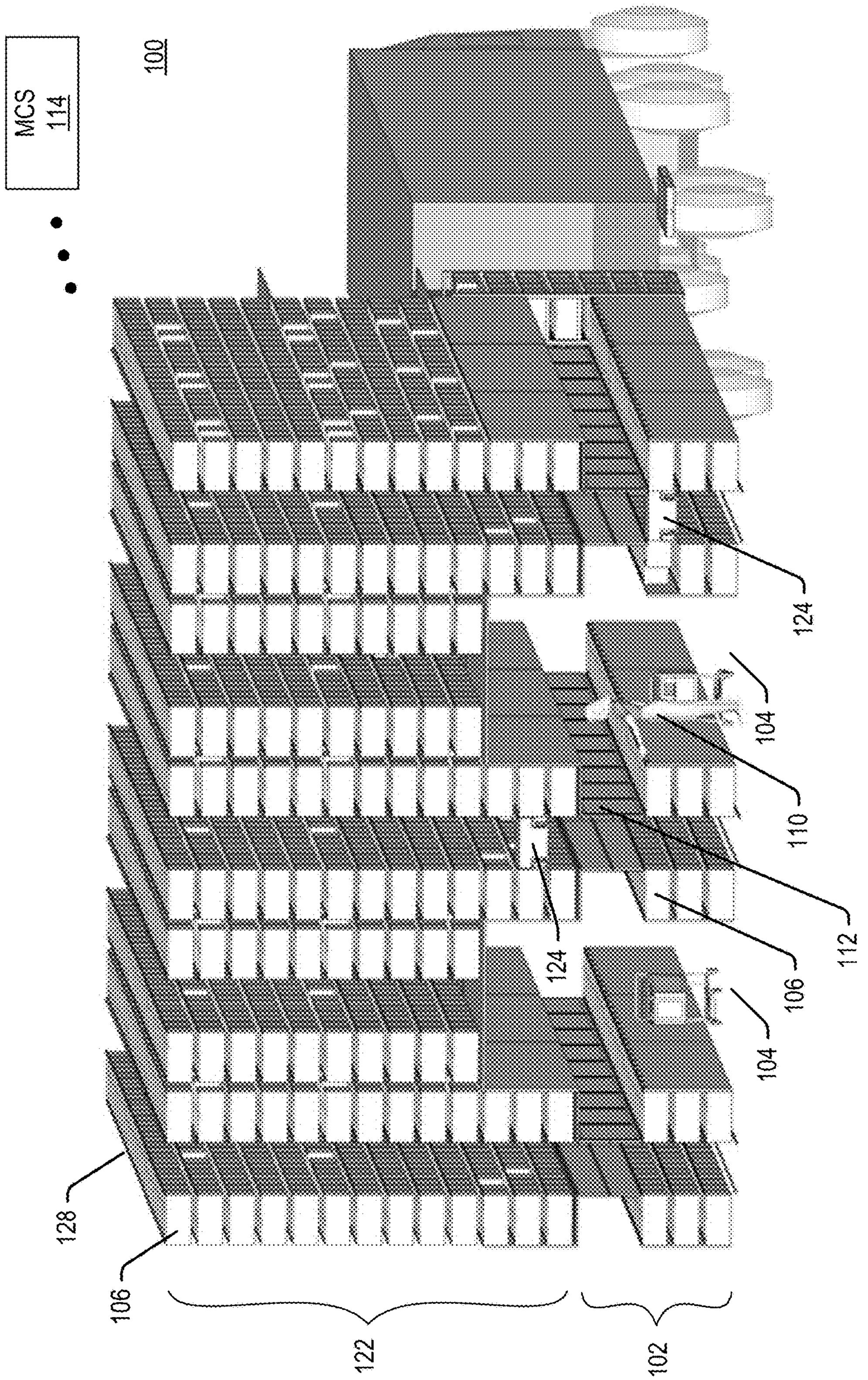
FIG. 1—Fully automated retail store where shoppers pick items directly from totes, sometime containing subtotes.
Figure 2:
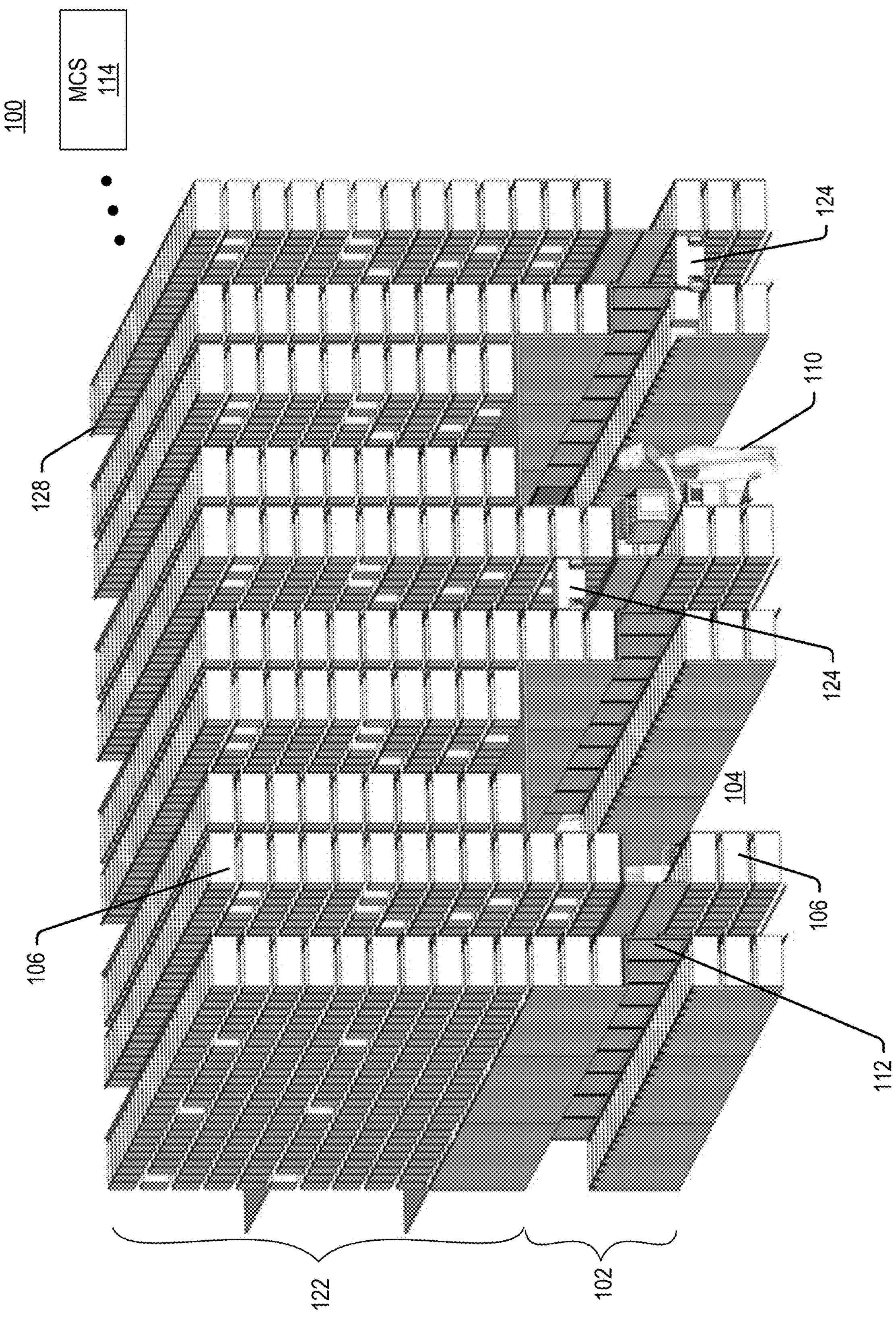
FIG. 2—Another view of shopping aisles within the fully automated retail store.

The present technology will now be explained with reference to the figures, which in general relate to an automated self-service retail store. Referring initially to FIGS. 1 and 2, there is shown a portion of an automated self-service retail store 100. The store 100 includes a shopper-accessible area 102 including multiple aisles 104 having totes 106 from which a shopper 110 can select eaches for placement in her shopping cart. The aisles 104 may include flat panel monitors 112 describing the eaches within a tote 106. The flat panel monitors may be other input terminals, such as displays, or interactive touchscreens, providing the price and information about items in the totes beneath them.

The store 100 may further include an item storage and replenishment area 122 positioned above the shopper-accessible area 102. The item storage and replenishment area 122 stores totes 106 in storage racks 128 for replenishing totes 106 in the shopper-accessible area 102. The storage racks are in turn connected to rails along which the mobile robots 124 travel. The totes 106 are automatically delivered by mobile robots 124 to the shopper-accessible area 102, for example when a tote in shopper-accessible area 102 is empty. At the same time, the item information above the tote is updated on the flat panel monitor. The robot 124 may replenish an empty tote 106 with the same or a different item. A central Material Control System (MCS) 114 controls the mobile robots and also updates the information above the totes. The MCS 114 may control when totes 106 in the shopper-accessible area 102 are replenished and with what. The MCS may also keep track of items removed from totes 106 by a shopper 110 as explained below.

FIGS. 1 and 2 show a single shopper-accessible area 102 positioned beneath the item storage and replenishment area 122. However, in further embodiments, the item storage and replenishment area 122 may be below, or on the same level as the shopper-accessible area 102. Additionally, in further embodiments, there may be multiple levels of shopper-accessible areas 102, each replenished from totes stored in the item storage and replenishment area 122.

FIGS. 1 and 2 show a system where inventory is maintained in totes 106 at the shopper-accessible level 102. However, in further embodiments, the shopper-accessible level 102 may not store inventory. Instead, the shopper-accessible level may include stations, (shopper stations) and display screens 112. In this embodiment, the shopper can select their desired items from the display screen, and totes containing those items are brought to the user by mobile robots 124. Once a shopper picks their desired item from a tote 106, the tote 106 may be carried away by the mobile robot 124, and additional totes brought to the shopper 110 with their selected items. The shopper's selected items may be brought to the user in totes carried by several different robots, whose movements are coordinated by the MCS 114. This embodiment is explained in greater detail with respect to FIG. 16.

Figure 3:
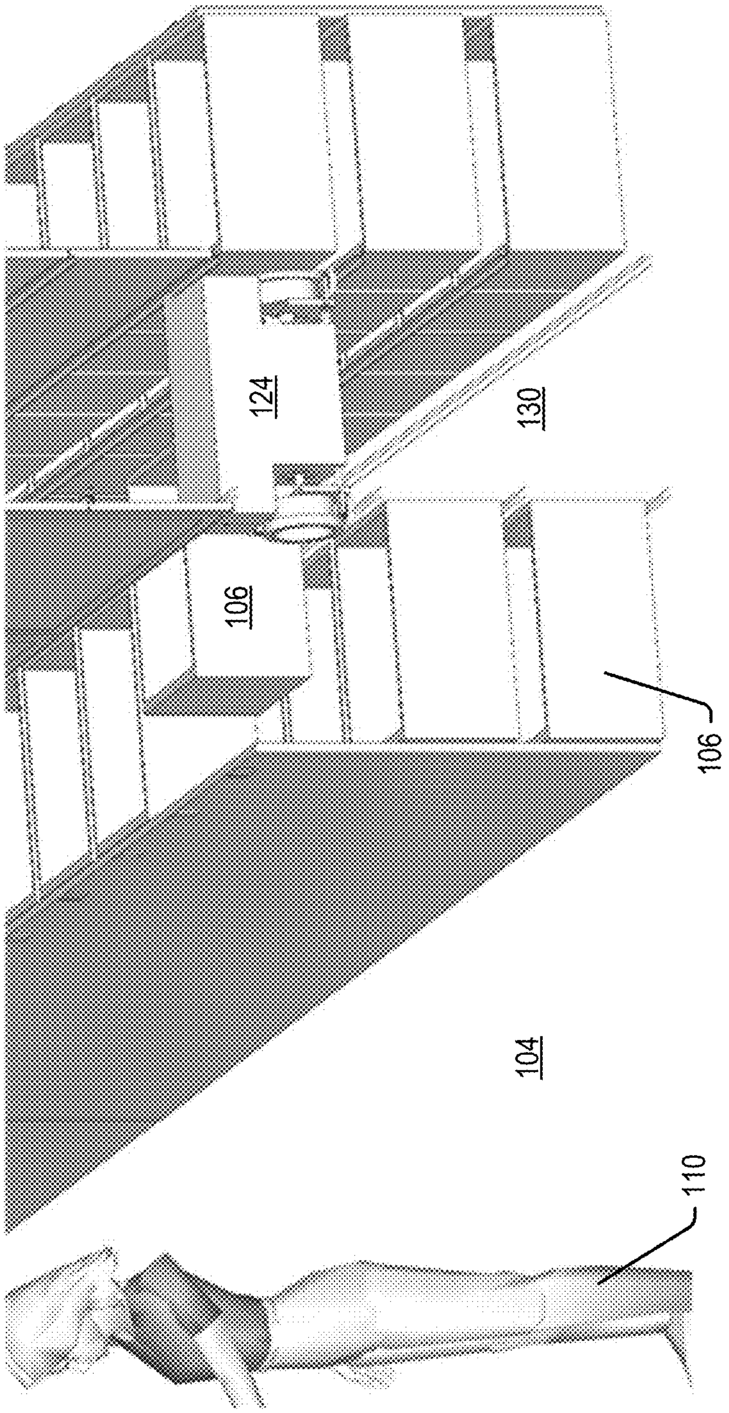
FIG. 3—Mobile robot is shown replenishing tote in shopping store aisle.

FIG. 3 shows a mobile robot 124 replenishing a tote 106 in an aisle 104 of the shopper-accessible area 102. The MCS tracks inventory level in the totes and subtotes and dispatches a mobile robot 124 to retrieve inventory from storage when inventory is depleted. For high velocity (fast-selling items), two totes of the same item can be located adjacent to each other to ensure the item is always available to the shopper. The MCS 114 can use intelligent inventory handling algorithms so that high velocity items may be stored at centrally located storage shelves for quick replenishment when the items run out at the shopper-accessible area 102.

The robots may travel vertically and horizontally within a space 130 between the aisles 104. The operation and travel of the robots to transfer totes within the store 100 are described for example in any of the following patents and applications: U.S. Pat. No. 9,139,363 issued Sep. 22, 2015, entitled "AUTOMATED SYSTEM FOR TRANSPORTING PAYLOADS"; U.S. Pat. No. 9,598,239 issued Mar. 21, 2017, entitled "AUTOMATED SYSTEM FOR TRANSPORTING PAYLOADS"; U.S. Patent Publication No. 2017-0137222 published May 18, 2017, entitled "AUTOMATED SYSTEM FOR TRANSPORTING PAYLOADS"; U.S. Patent Publication No. 2017-0137223 published May 18, 2017, entitled "AUTOMATED SYSTEM FOR TRANSPORTING PAYLOADS"; U.S. Patent Publication No. 2016-0355337 published Dec. 8, 2016, entitled "STORAGE AND RETRIEVAL SYSTEM"; U.S. Patent Publication No. 2017-0313514 published Nov. 2, 2017, entitled "ORDER FULFILLMENT SYSTEM"; U.S. Patent Publication No. 2018-0134492 published May 17, 2018, entitled "ORDER FULFILLMENT SYSTEM"; U.S. application Ser. No. 15/867,373 filed Jan. 10, 2018, entitled "SYSTEM AND METHOD OF ROBOT TASK ASSIGNMENT AND MANAGEMENT"; U.S. patent application Ser. No. 15/826,045 filed Nov. 29, 2017, entitled "INVENTORY MANAGEMENT SYSTEM"; and U.S. patent application Ser. No. 15/903,993 filed Feb. 23, 2018, entitled "INVENTORY MANAGEMENT SYSTEM AND METHOD". Each of the above identified patents and applications are incorporated by reference herein in their entireties.

Figure 4:
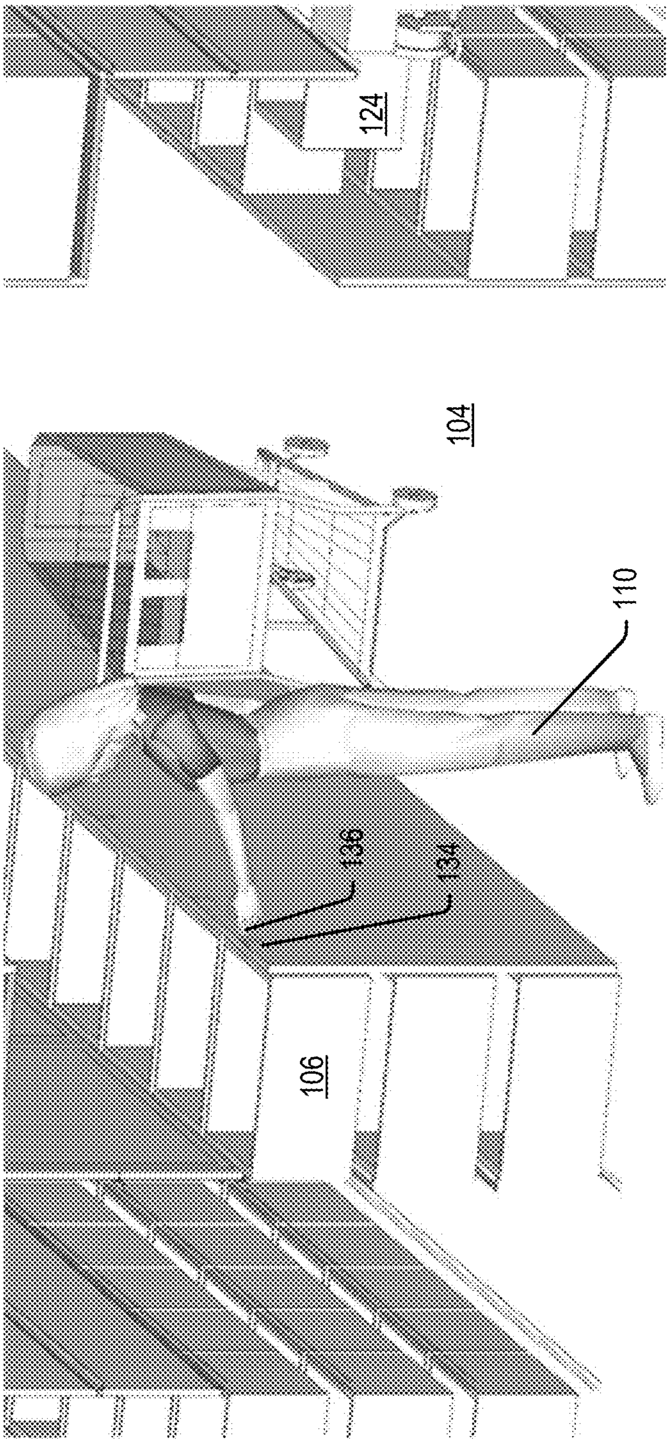
FIG. 4—Shopper using finger mounted or key-fob RFID reader is shown to read item them are purchasing from tote.

FIG. 4 shows a shopper 110 using reader 136 to read an RFID tag 134 for an item the shopper is purchasing from a tote 106. The reader 136 may for example be a finger mounted FOB RFID reader, key FOB RFID reader or a shopping wand RFID reader. Other types of electronic readers may be used for reading other types of machine readable codes on tag 134, digital or analog. Each tote location may contain a permanent RFID tag in front of it. When a shopper scans a tag 134 with her reader 136, the MCS 114 knows the location of the tote from which the shopper is picking an item. The MCS 114 also knows what tote/item is stored at that location. Thus, when a shopper uses her reader 136 to scan a tag 134, the MCS is able to determine what item the shopper has selected, and the shopper is charged for the item they select. Further details of this process are explained below with respect to FIG. 14.

Figure 5:
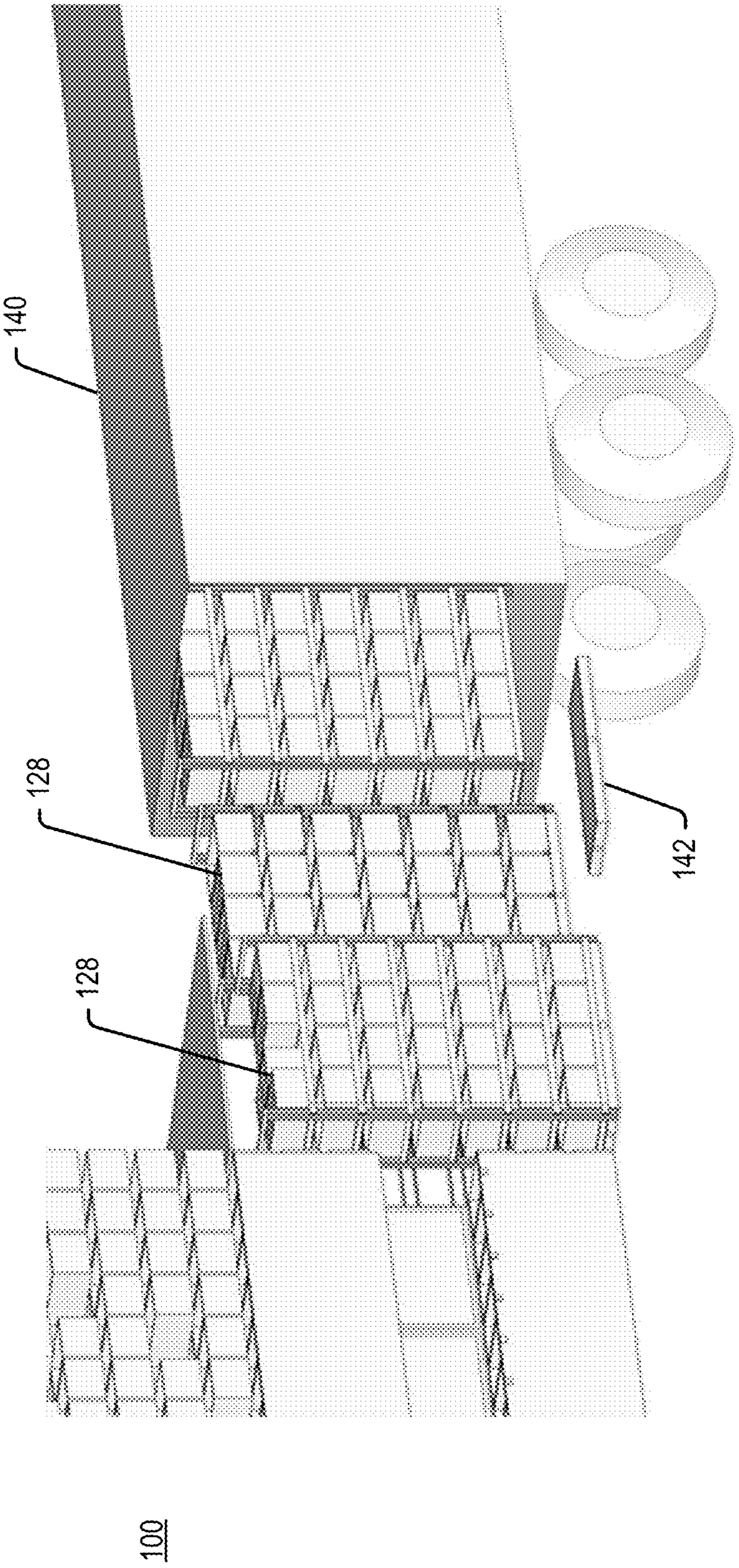
FIG. 5—Racks containing totes are shown automatically transported by pallet bots from trailers and docked to mobile robot rails extending out of the tote storage structure.
Figure 6:
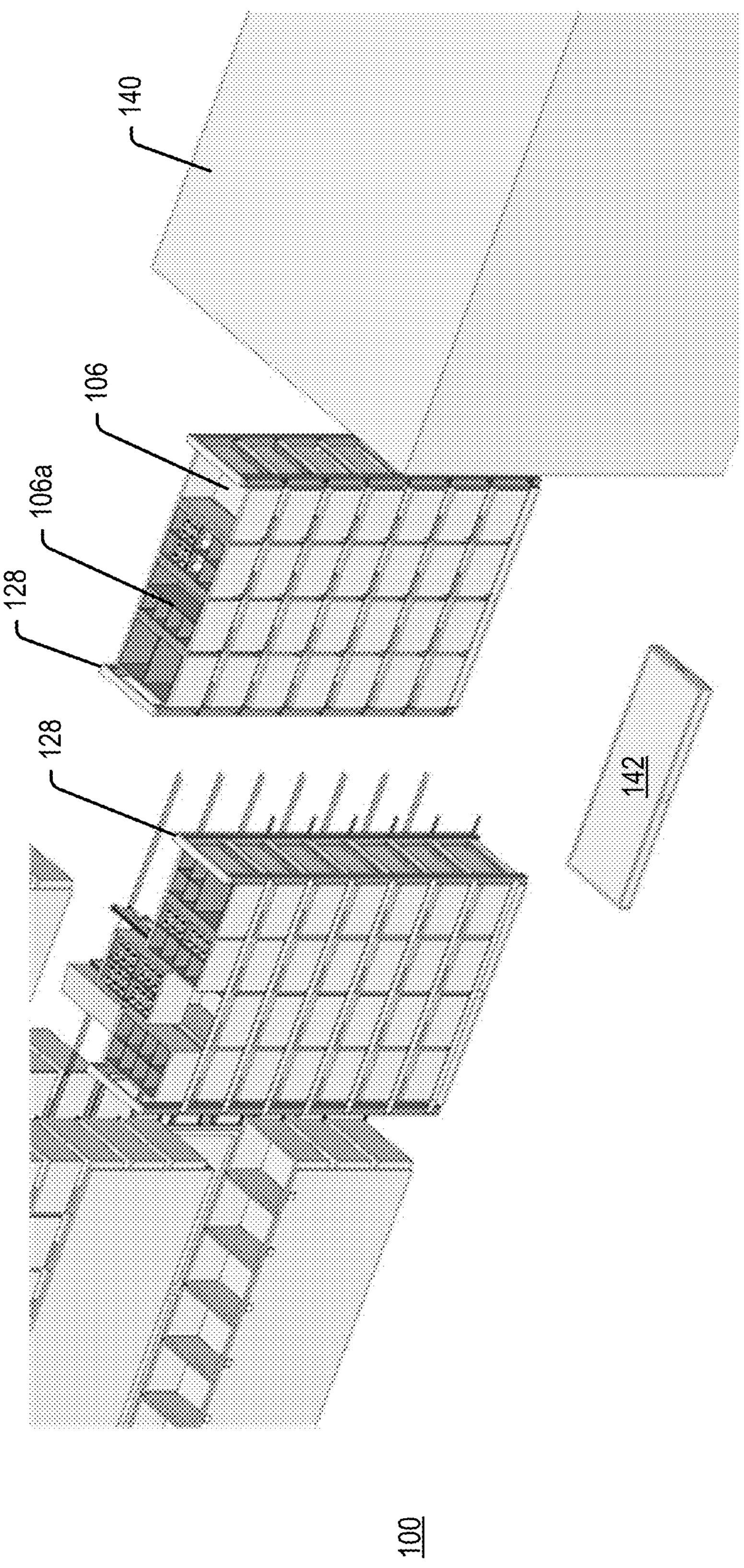
FIG. 6—Mobile robot is shown retrieving a tote containing incoming products from the tote rack.
Figure 7:
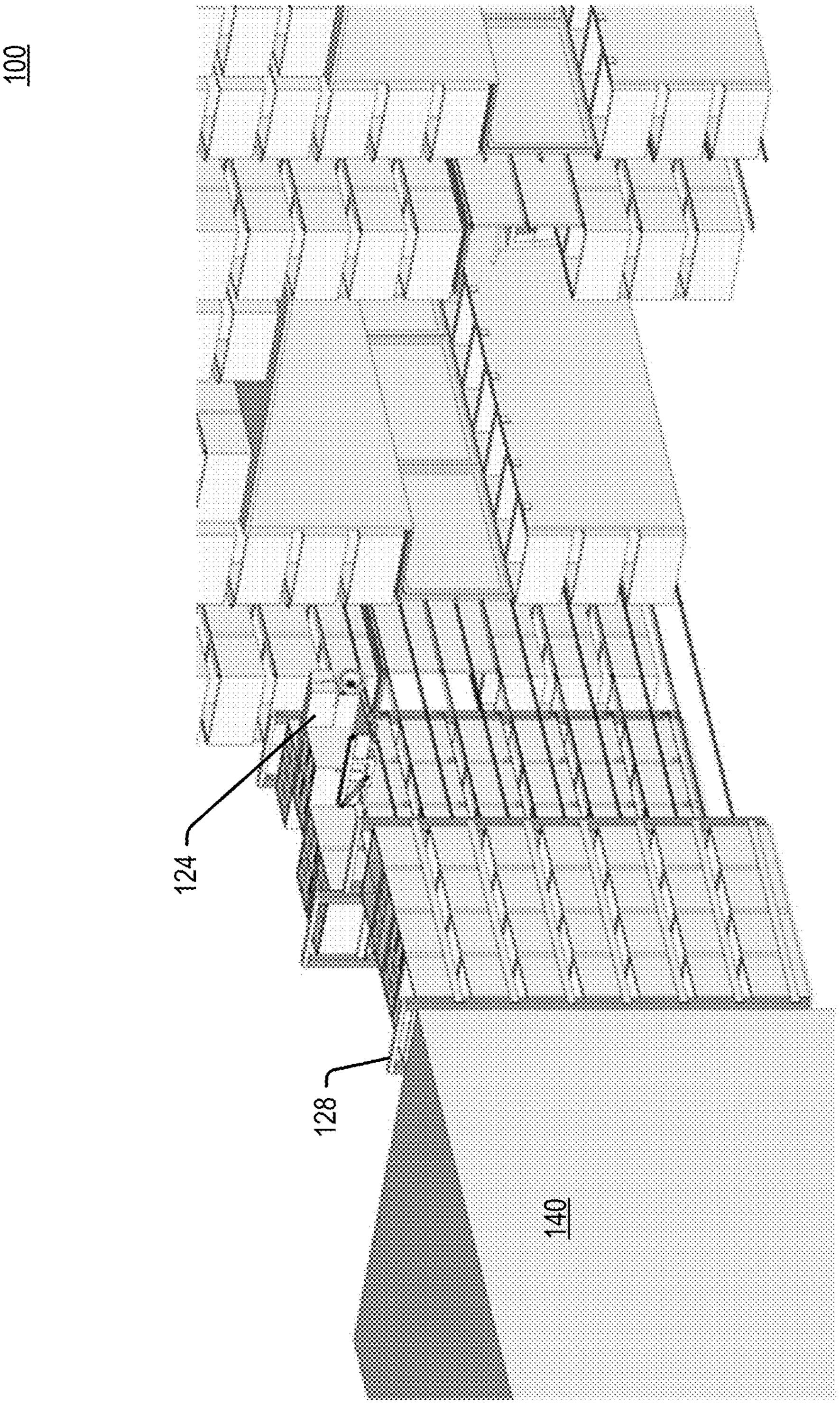
FIG. 7—Another view of mobile robot retrieving tote from tote rack.

FIGS. 5 and 6 shows racks 128 (also called storage shelves herein) containing totes 106 being transferred from a trailer 140 or other rack transport. Racks 128 can be pre-populated with inventory totes 106 at a distribution center and sent to stores 100. Once at the store 100, the racks 128 may be automatically transported by pallet bots 142 from trailers 140 and docked directly to mobile robot rails extending out of the tote storage structure. Once docked to a transport rail, a mobile robot 124 is able to retrieve a tote 106 containing incoming products from the tote rack, as shown for example in FIG. 7. The bot will store the tote within the tote storage structure, or alternatively directly to a position immediately accessible to shoppers. FIG. 6 also shows subtotes 106*a* within a tote 106.

Figure 8:
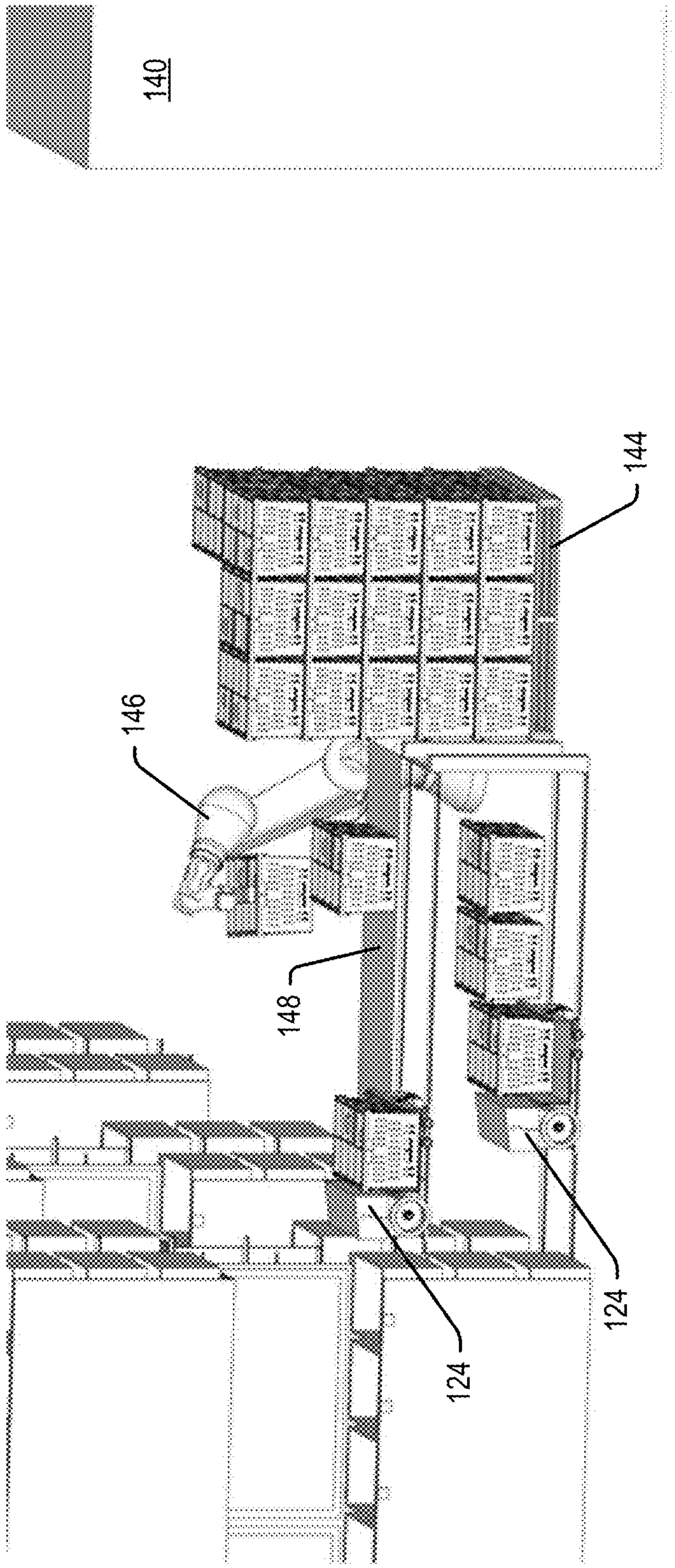
FIG. 8—An articulated arm robot is shown moving the totes from the pallet to shelf locations where the mobile robots can retrieve the totes and transfer them into the storage structure.

FIG. 8 shows an alternative embodiment of the present technology. Instead of tote racks, totes 106 may be delivered to the store 100 stacked on pallets 144. Thereafter, an articulated arm robot 146 may be used to move the totes 106 from the pallet to shelf locations 148 where the mobile robots 124 can retrieve the totes and transfer them to storage shelves 128 within the store 100. Human laborers may be used in addition to or instead of articulated arm robot 146.

Figure 9:
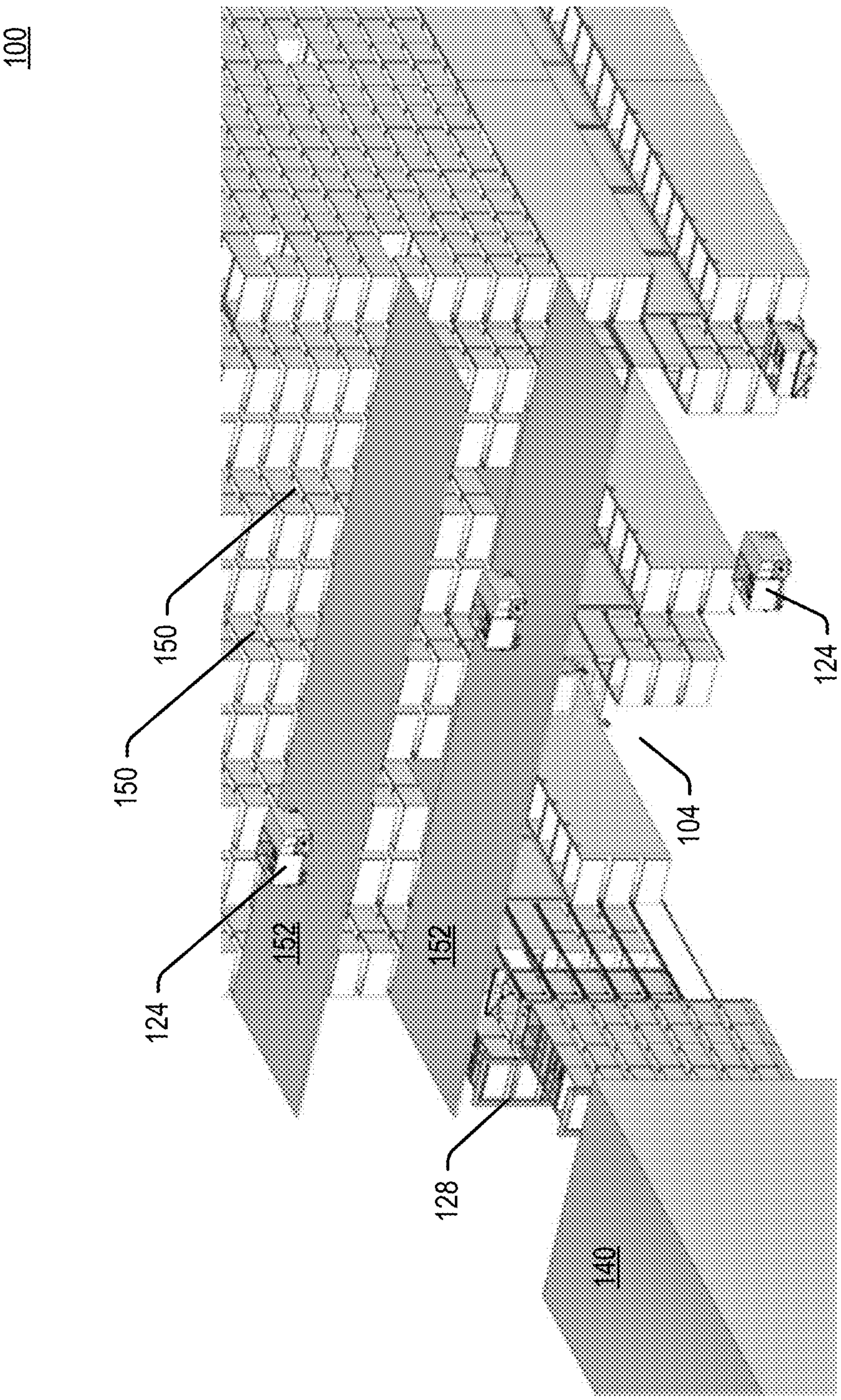
FIG. 9—Mobile robots are shown accessing any of the tote storage aisles.

FIG. 9 illustrates mobile robots 124 accessing any of the tote storage aisles 150 in the item storage and replenishment area 122 (not to be confused with shopper aisles 104 in the shopper-accessible area 102). The robots 124 can travel between the tote storage aisles 150 via transition decks 152 between the aisles 150. As noted in the above-referenced patents and applications, the mobile robots 124 may use two-wheel torque steering to traverse horizontal decks 152. The mobile robots can also move between aisles by moving on a deck in the shopper-accessible area 102.

Figure 10:
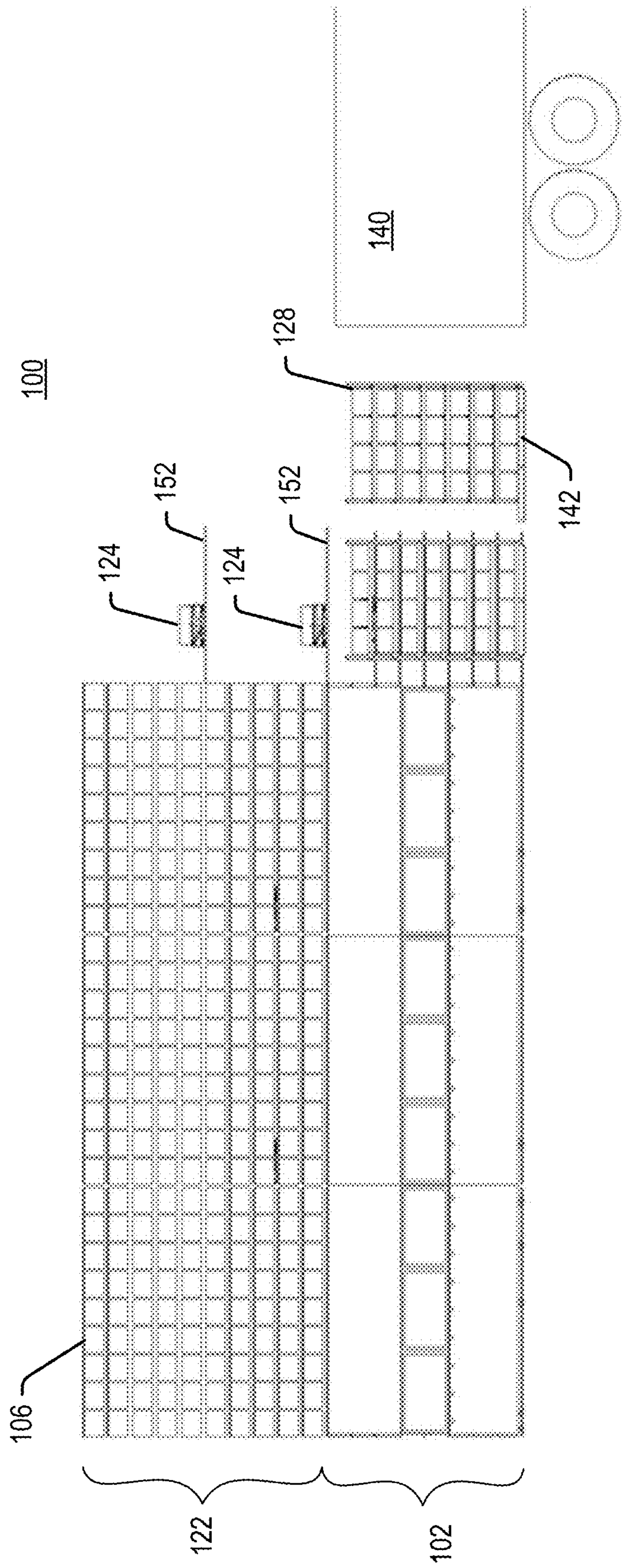
FIG. 10—Side Elevation View of Fully Automated Retail Store.
Figure 11:
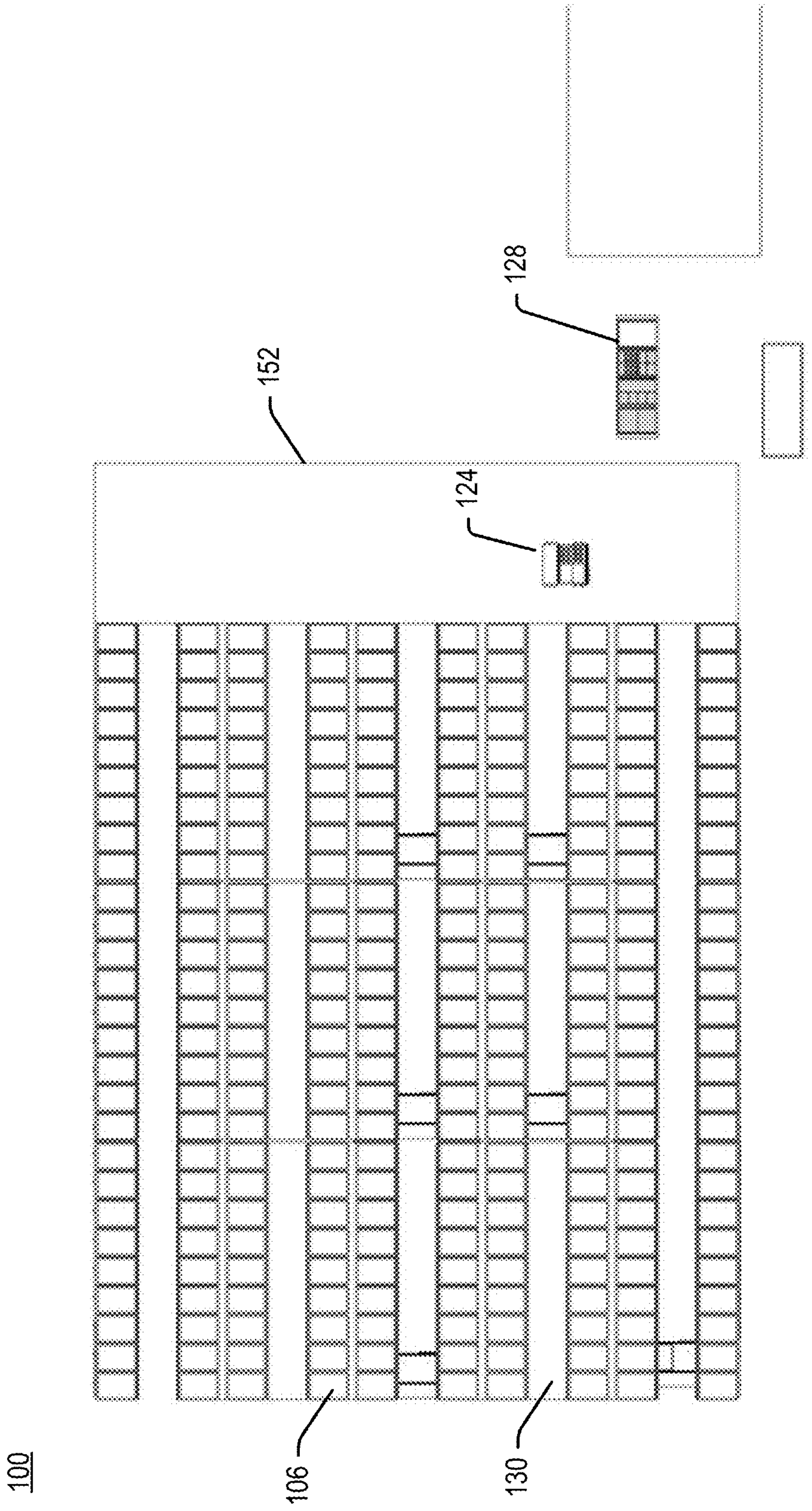
FIG. 11—Plan View of Fully Automated Retail Store.
Figure 12:
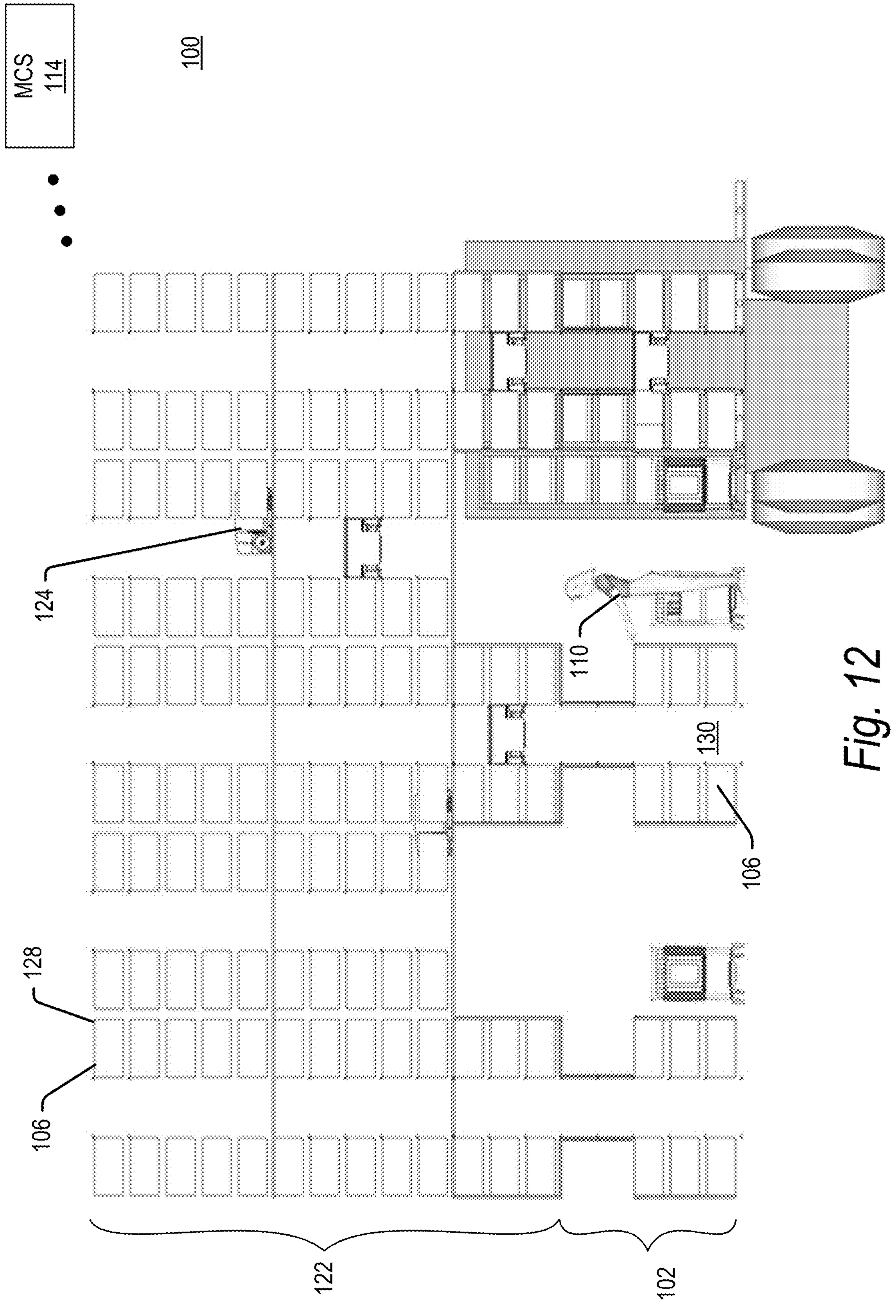
FIG. 12—Front Elevation of Fully Automated Retail Store.

FIGS. 10-12 show additional views of an embodiment of an automated self-service store 100. FIG. 10 shows a side elevation view of fully automated retail store. FIG. 11 shows a plan or top elevation view of fully automated retail store. FIG. 12 shows a front elevation view of fully automated retail store.

Figure 13:
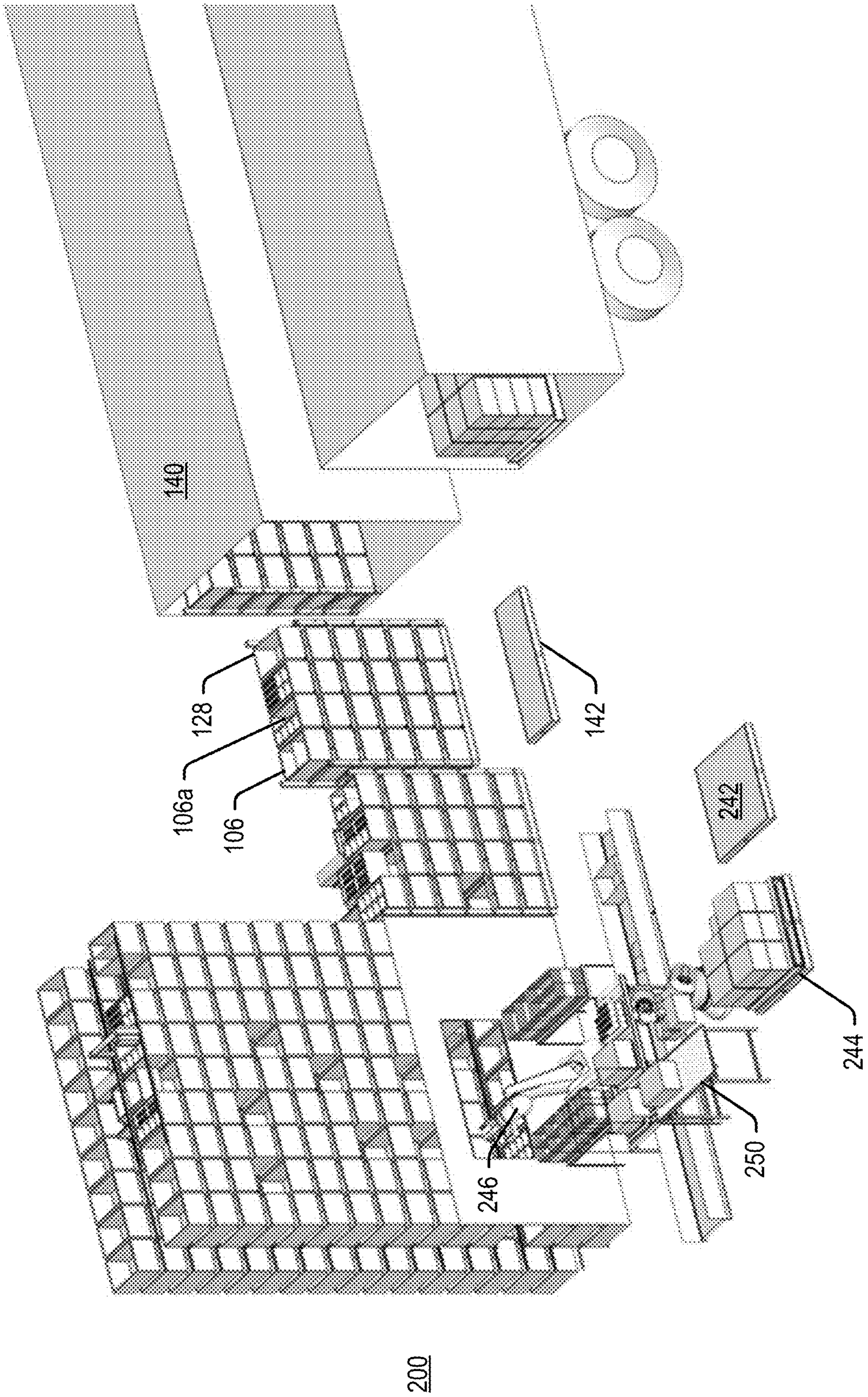
FIG. 13—Fully Automated Distribution Center.

FIG. 13 is a view of an automated distribution center 200 for shipping totes to the automated self-service store 100. Examples where the mobile robots 124 operate in a distribution center are disclosed in one or more of the above-referenced patents and applications. Pallets 244 received from a manufacturer or distributor are automatically transported by pallet bots 242 to decanting stations 250. Articulated arm robots 246 lift cases from pallets, automatically open them and transfer eaches into totes 106 or subtotes 106*a* within the totes 106. Mobile robots 124 store the totes, or immediately place them into tote racks 128 to be moved into tractor trailers 140 for delivery to the fully automated retail store 100.

As an alternative to racks 128, the totes may be stacked directly on top of each other on pallets 144 for delivery to the store 100. The direct stacking of the totes may be preferably executed using an articulated arm robot, or alternatively human laborers.

Figure 14:
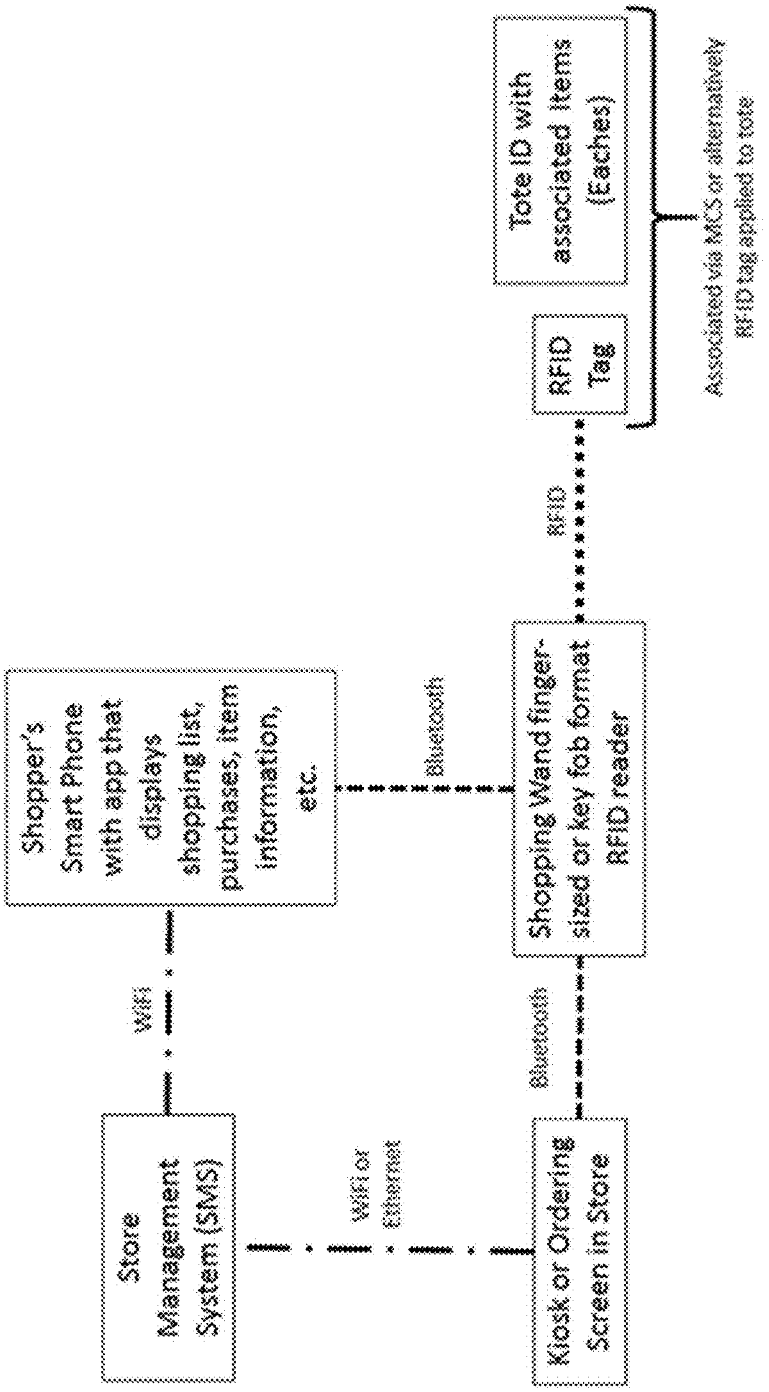
FIG. 14—RFID Reader Flow Diagram.

FIG. 14 illustrates a flow for recording selected items for charging shoppers. The store management system (which may be the same as the Material Control System (MCS) 114) interacts with a client device application on the smartphone (or other computing device) of each shopper, which is mated via Bluetooth to the reader 136. In the case the shopper does not have a smartphone, a store device will be provided to them that is registered to them using their personal Shopping Wand. The app is thus the pass-through for RFID and barcode data read by the wand. As noted above, when a shopper scans a tag 134 with her reader 136, the MCS 114 knows the location of the tote from which the shopper is picking an item. The MCS 114 also knows what tote/item is stored at that location. Thus, when a shopper uses her reader 136 to scan a tag 134, the MCS is able to determine what item the shopper has selected, and the shopper is charged for the item they select.

The system may also work with items which are charged depending on their weight. When the app sends SMS a SKU identity from a random-weight item (e.g. loose produce), the SMS looks for a scale identity, then reads the weight off that scale. When the app send SMS the barcode from a random-dollar item, SMS simply rings up the item based on the price in the barcode. When the app sends SMS the identity of a checkout kiosk or ordering screen, SMS activates the kiosk or screen for an interactive session with the customer. Customers can order items for immediate fulfillment by a mobile robot 124 either directly via their phone app, or via the ordering screen.

Figure 15:
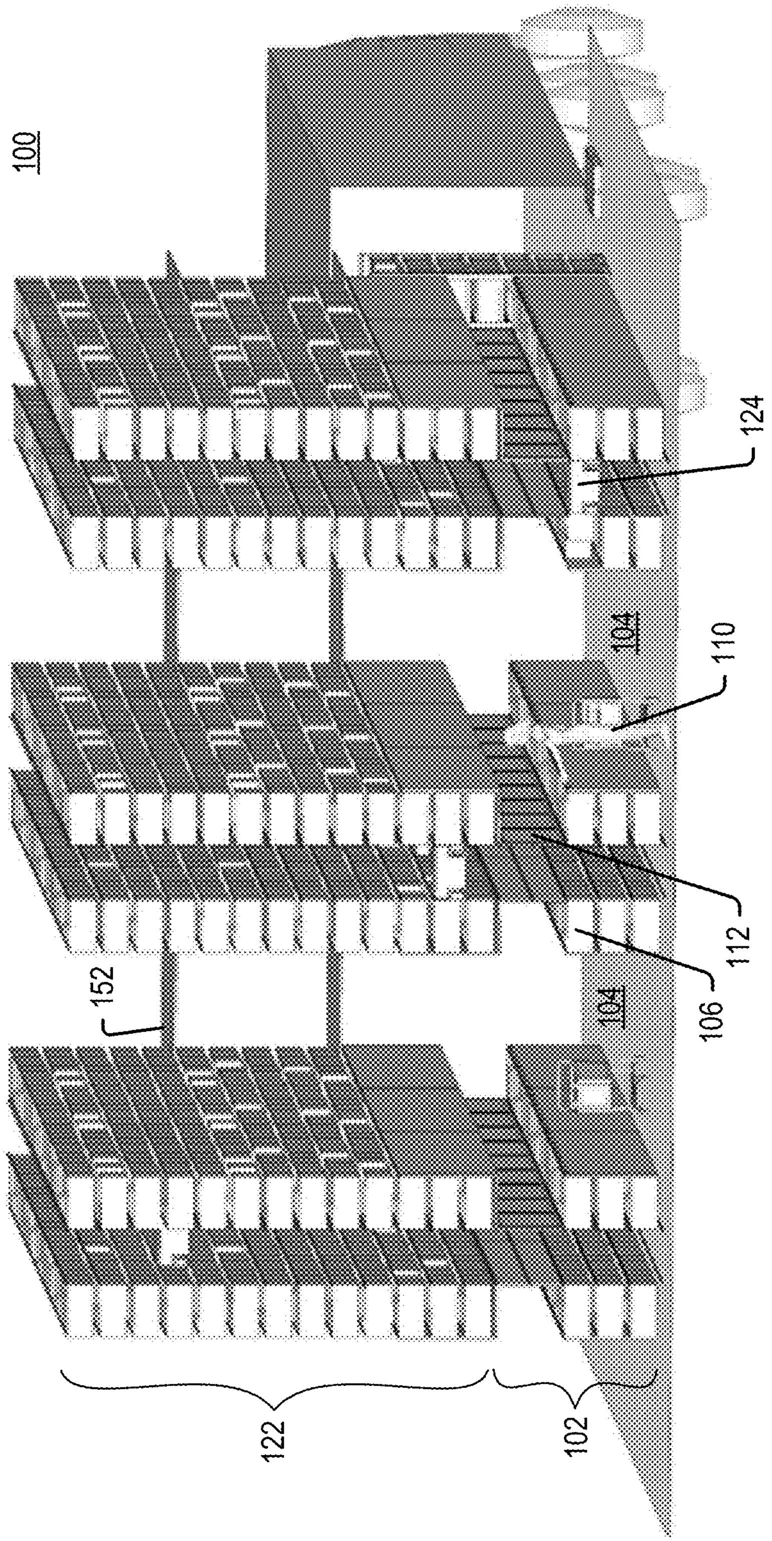
FIG. 15—Alternative configuration of system without storage over shopping aisles. This configuration permits skylights to lighten shopping aisle.

FIG. 15 illustrates an alternative configuration of store 100 without storage over shopping aisles 104. This configuration permits skylights to lighten shopping aisles 104.

Figure 16:
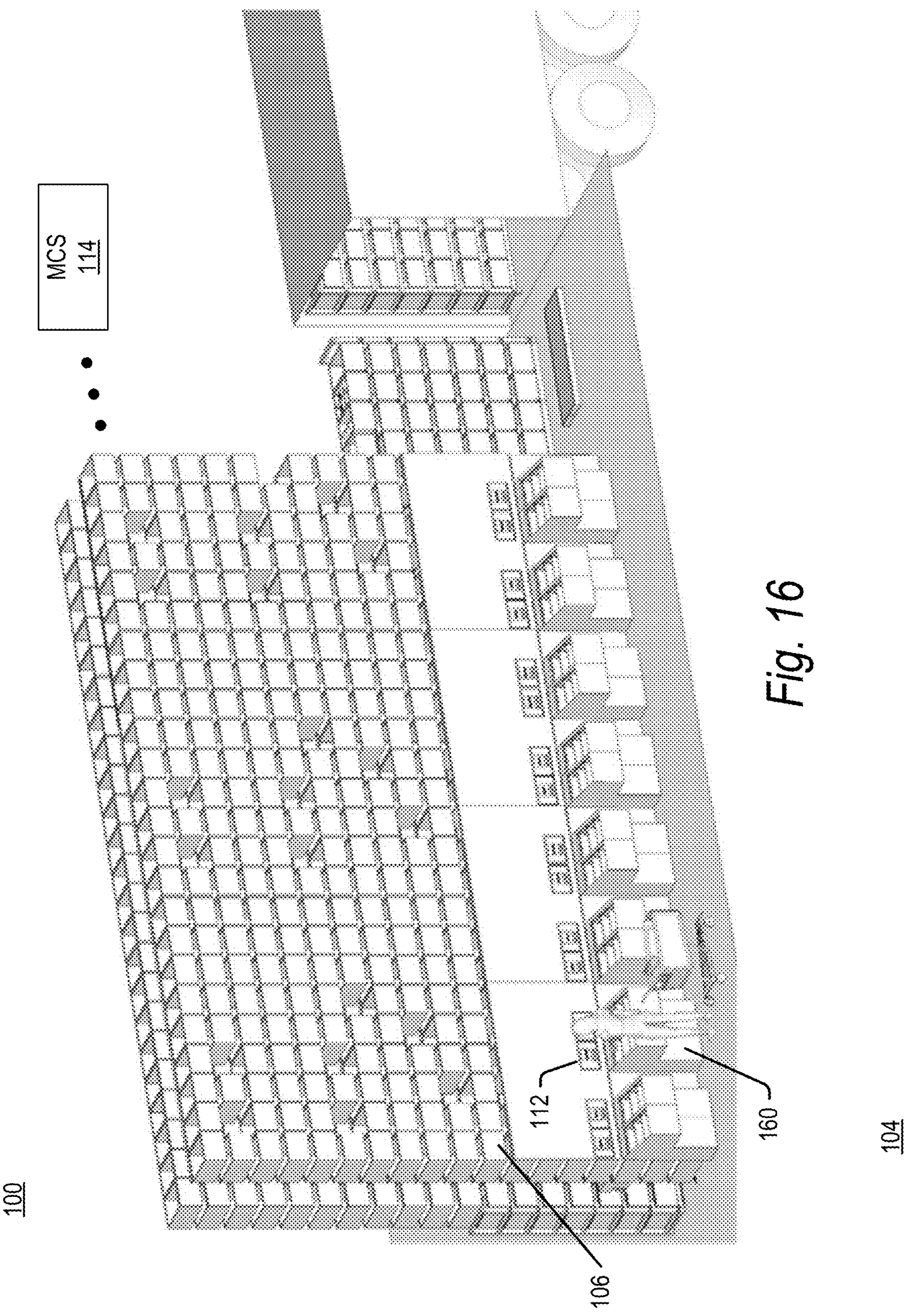
FIG. 16—Shopping stations are shown where totes are presented to shoppers based on their specific order or request.

FIG. 16 illustrates an embodiment including shopping stations where totes are presented to shoppers based on their specific order or request. In this embodiment, the shopper can select their desired items from the display screen 112, and totes containing those items are brought to the shopping station 160 by mobile robots 124. Once a shopper picks their desired item from a tote 106, the tote 106 may be carried away by the mobile robot 124, and additional totes brought to the shopper 110 with their selected items. The shopper's selected items may be brought to the user in totes carried by several different robots, whose movements are coordinated by the MCS 114.

There can be multiple levels of shopping stations 160, vertically aligned with each other at different levels. The rails on which the mobile robots ride deliver the mobile robots to the appropriate level, and appropriate shopping station at the level, under the control of MCS 114.

In the configuration of FIG. 16, the totes may be shifted forward and tilted towards the shopper at an angle of approximately 15-20 degrees to permit easier access into the tote. Shoppers may interact with the touchscreen displays above the stations to retrieve their order, or specific items they would like to buy. Access doors may be placed over the totes to restrict shoppers to only accessing a portion of the tote; e.g. a subtote. The access doors may also be used to restrict access into the area of the tote while the tote is being inserted or retrieved by a bot.

Figure 17:
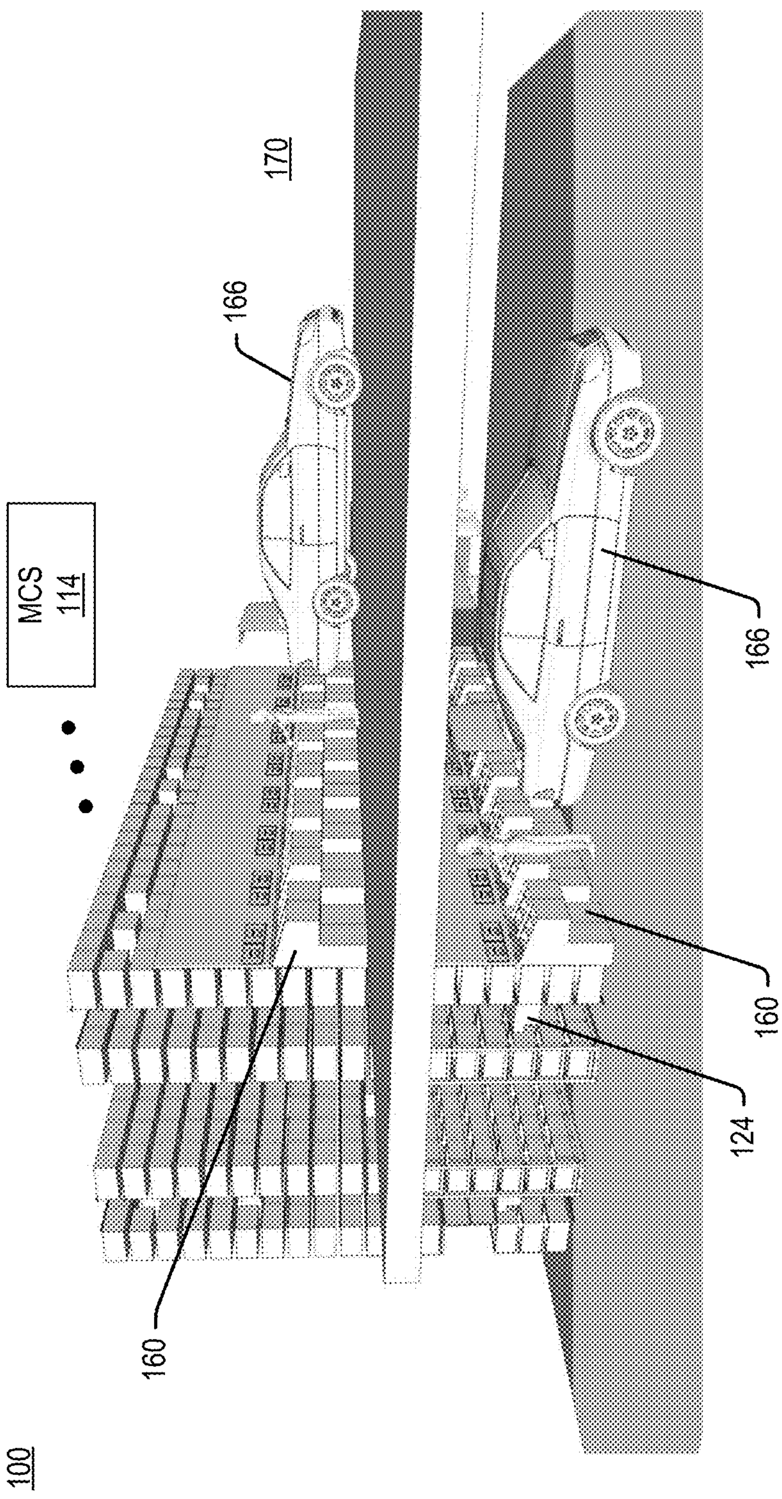
FIG. 17—Shopping stations are shown in a parking structure where totes are presented to shoppers based on their specific order or request.

FIG. 17 shows an embodiment similar to that of FIG. 16 including shopping stations 160. However, this embodiment is implemented inside a parking structure 170 associated with the automated self-service store 100. In this embodiment, shoppers may select items as described above from a shopping station 160 within the parking structure 170, and the selected items are delivered by mobile robots 124 to the shopping stations 160. According to this embodiment, the user may transfer the selected items directly to his or her car 166 (or bicycle or other mode of transport) within the parking structure 170.

There may be multiple levels in the parking structure 170, and each level may have shopping stations as described above. The rails on which the mobile robots 124 ride deliver the mobile robots to the appropriate level within parking structure 170, and appropriate shopping station 160 at the level, under the control of MCS 114.

Figure 18:
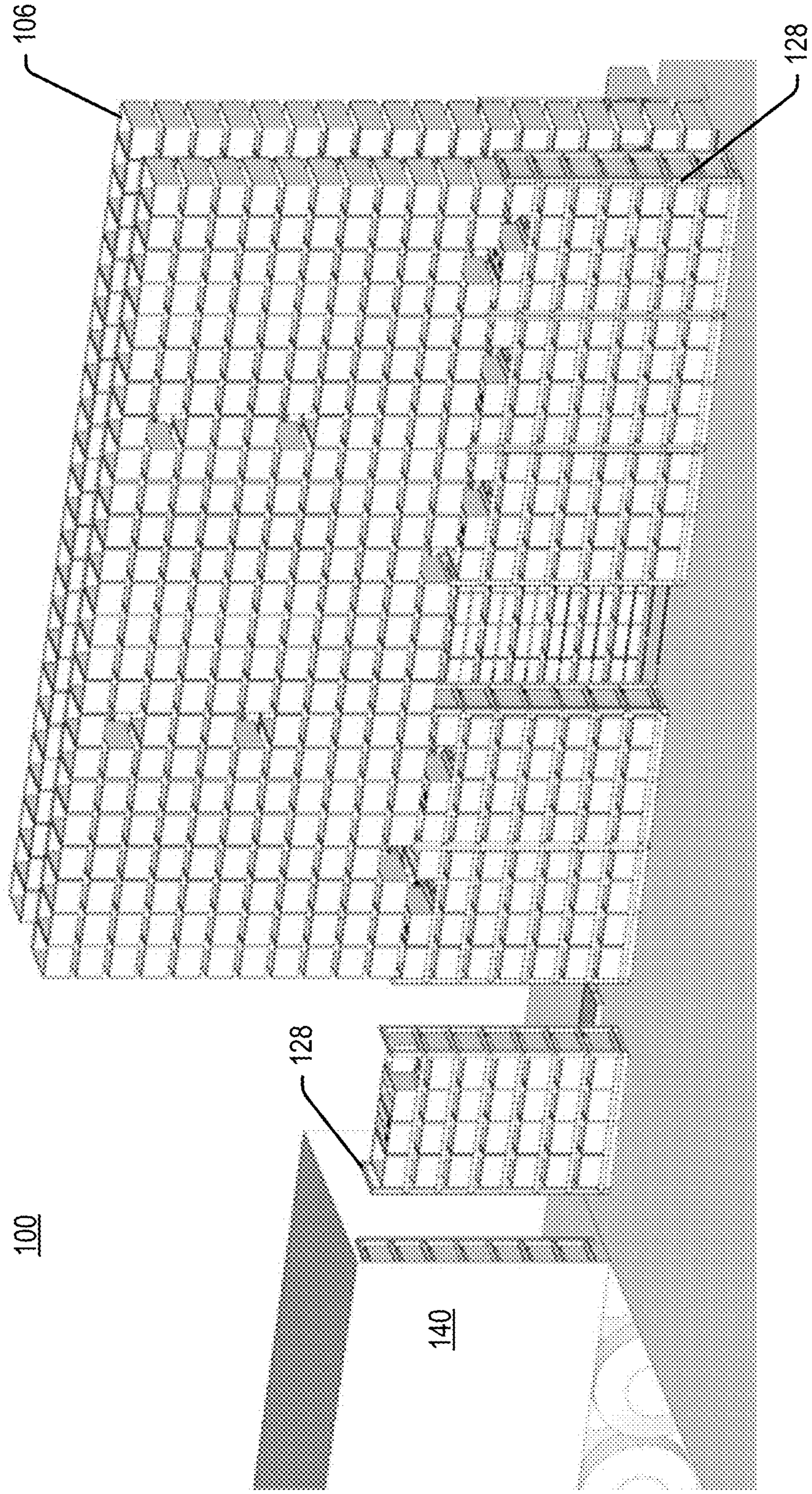
FIG. 18—Alternative configuration of way to mount racks is shown containing totes to the storage array.

FIG. 18 is an alternative configuration of way to mount racks containing totes to the storage array. In this configuration, the racks 128 are pushed into engagement with the storage array at positions along the aisle 150. This permits many more totes to be accessible to robots 124 performing exchanges of old empty totes with new full totes transported from an upstream distribution center.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

We claim:

1. An automated self-service store, comprising:

a shopper accessible level comprising shopper accessible storage shelves configured to hold inventory for selection by a shopper;

an item storage and replenishment area having storage shelves for storing inventory, the item storage and replenishment area having a different level than the shopper accessible level, the item storage and replenishment area being inaccessible to the shopper; and autonomous guided mobile robots configured so as to be controlled to travel to and between the shopper accessible level and the item storage and replenishment area, that is inaccessible to the shopper, for interfacing with and transferring inventory from the storage shelves of the item storage and replenishment area, inaccessible to the shopper, to one or more shopper accessible storage shelves at the shopper accessible level, the inventory being available for selection by the shopper after the inventory is transferred by the autonomous guided mobile robots from the item storage and replenishment area, inaccessible to the shopper, to the shopper accessible storage shelf of the shopper accessible storage shelves.

2. The automated self-service store of claim 1, wherein the inventory is stored in totes, the autonomous guided mobile robots replenishing the totes at the shopper accessible level from the item storage and replenishment area.

3. The automated self-service store of claim 1, further comprising display screens at the shopper accessible level for describing inventory for selection by the shoppers.

4. The automated self-service store of claim 1, further comprising a machine readable tag associated with inventory at the shopper accessible level.

5. The automated self-service store of claim 4, further comprising a reader for use by the shopper for scanning the machine readable tag.

6. The automated self-service store of claim 5, further comprising a material control system for identifying a scanned machine readable tag and for identifying inventory associated with that machine readable tag.

7. An automated store, comprising:

a user accessible area at which one or more totes are brought to present inventory for selection by a user for removal and placement into a movable shopping container, the movable shopping container configured to be located near the one or more totes to receive one or more items of inventory selected by the user;

an item storage area having storage shelves for storing inventory, the item storage area being configured so as to be in accessible to the user;

autonomous guided mobile robots configured to travel to and between the user accessible area and the item storage area that is inaccessible to the user, the autonomous guided mobile robots further configured to transport the inventory from the storage shelves of the item storage area, inaccessible to the user, to the user accessible area; and a material control system (MCS) configured to direct the autonomous guided mobile robots to travel from the item storage area, inaccessible by the user, to the user accessible area to present the inventory, carried by the autonomous guided mobile robots, to the user at the user accessible area.

8. The automated self-service store of claim 7, wherein the user accessible area is inside the store.

9. The automated self-service store of claim 7, wherein the user accessible area is inside a parking structure associated with the store.

10. The automated self-service store of claim 7, wherein the MCS directs the autonomous guided mobile robots to replenish depleted inventory with identical inventory.

11. The automated self-service store of claim 7, wherein the MCS directs the autonomous guided mobile robots to replenish depleted inventory with inventory that is different than the depleted inventory.

12. The automated self-service store of claim 7, further comprising a display screen associated with each of the multiple locations, the MCS causing display of information on display screens identifying the inventory at the locations.

13. The automated self-service store of claim 12, wherein the MCS updates the information displayed on the display screen when the inventory at a location of the multiple locations is changed.

14. The automated self-service store of claim 7, wherein the MCS monitors selection of the inventory from one or more of the multiple locations by the user and generates an amount owed by the user for the selected inventory.

15. The automated self-service store of claim 14, further comprising an inventory identifier associated with each of the multiple locations, the MCS receiving an indication of an item selected at a location by the user upon receiving an indication of a scan of the inventory identifier by a device associated with the user.

16. An automated self-service store, comprising:

a shopper accessible station configured to present inventory for selection by a shopper, the shopper accessible station comprising a user interface configured to receive an order for specific items of inventory;

an item storage and replenishment area having storage shelves for storing inventory, the item storage and replenishment area being configured so as to be inaccessible to the shopper;

autonomous guided mobile robots configured to move around the automated self-service store to transfer inventory from the storage shelves of the item storage and replenishment area, that is inaccessible to the shopper, to the shopper accessible station, the inventory being accessible by the shopper and available for selection by the shopper after the inventory is transferred by the autonomous guided mobile robots from the item storage and replenishment area, inaccessible to the shopper, to the shopper accessible station by the autonomous guided mobile robots; and a material control system configured to:

receive the order for the specific items of inventory, and direct one or more autonomous guided mobile robots to retrieve the specific items of inventory from the storage shelves of the item storage and replenishment area, inaccessible to the shopper, and to travel from the item storage and replenishment area, inaccessible to the shopper, to the shopper accessible station to deliver the specific items of inventory, held on the one or more autonomous guided robots, from the item storage and replenishment area, inaccessible to the shopper, to the shopper accessible station.

17. The automated self-service store of claim 16, wherein the autonomous guided mobile robots are further configured to transfer the inventory directly from an incoming product area to the shopper accessible level.

18. The automated self-service store of claim 17, wherein the inventory is received at the incoming product area in totes stored in racks.

19. The automated self-service store of claim 18, wherein the autonomous guided mobile robots retrieve the totes directly from the racks and transfer the totes to the item storage and replenishment area.

20. The automated self-service store of claim 17, wherein the autonomous guided mobile robots comprise a first group of autonomous guided mobile robots, and wherein the inventory is received at the incoming product area in totes from a delivery vehicle, the self-service store further comprising a second group of autonomous guided mobile robots for transferring the totes from the delivery vehicle to the incoming product area.

* * * * *